United States Patent [19]

Hammer et al.

[11] 4,362,367

[45] Dec. 7, 1982

[54] MINIATURIZED SYMMETRIZATION OPTICS FOR JUNCTION LASER

[75] Inventors: Jacob M. Hammer, Plainsboro; Charlie J. Kaiser, Trenton, both of N.J.; Clyde C. Neil, Levittown, Pa.

[73] Assignee: RCA Corporation, New York, N.Y.

[21] Appl. No.: 167,689

[22] Filed: Jul. 11, 1980

[51] Int. Cl.³ .............................................. G02B 13/18
[52] U.S. Cl. ................................................... 350/433
[58] Field of Search .......................................... 350/433

[56] References Cited

U.S. PATENT DOCUMENTS

| 3,345,120 | 10/1967 | Palmer | 350/433 |
|---|---|---|---|
| 4,253,735 | 3/1981 | Kawamura et al. | 350/433 |
| 4,318,594 | 3/1982 | Hanada | 350/433 |

Primary Examiner—John K. Corbin
Assistant Examiner—Rebecca D. Gass
Attorney, Agent, or Firm—Samuel Cohen; Joseph S. Tripoli; George J. Seligsohn

[57] ABSTRACT

Miniaturized optics comprising transverse and lateral cylindrical lenses composed of millimeter-sized rods with diameters, indices-of-refraction and spacing such that substantially all the light emitted as an asymmetrical beam from the emitting junction of the laser is collected and translated to a symmetrical beam.

5 Claims, 7 Drawing Figures

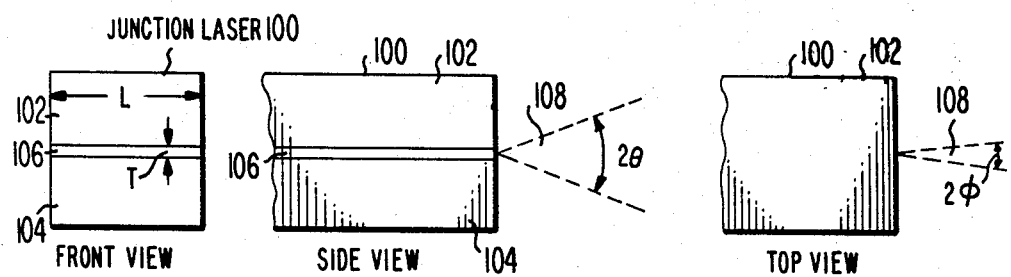
Fig.1a  Fig.1b  Fig.1c
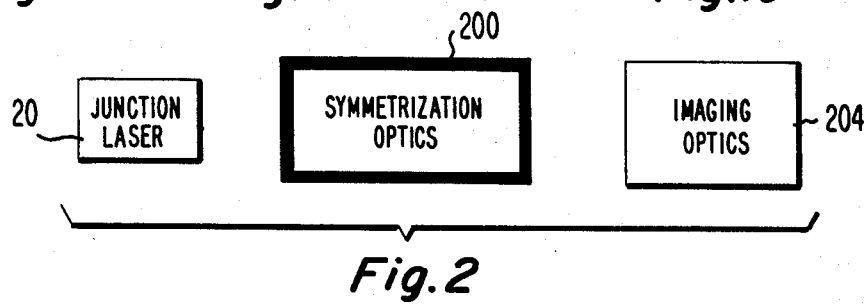
Fig.2
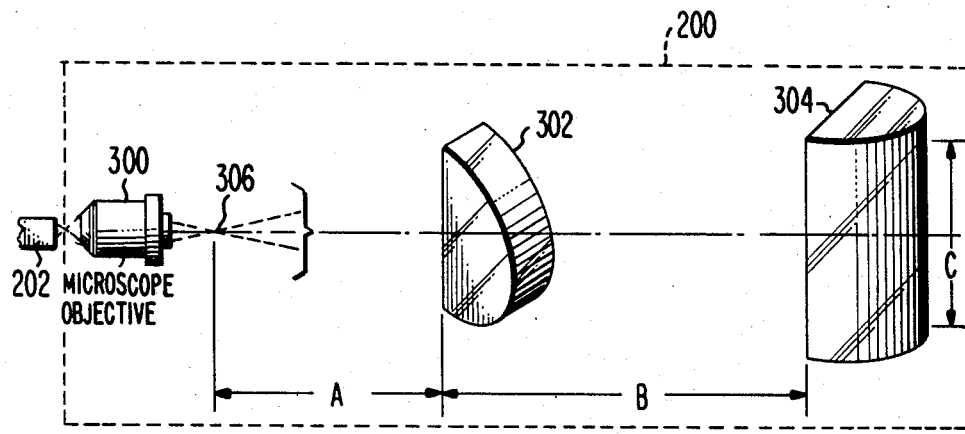
PRIOR ART  Fig.3
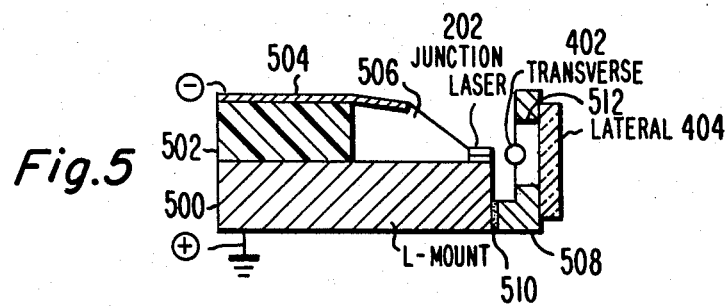
Fig.5

MINIATURIZED SYMMETRIZATION OPTICS FOR JUNCTION LASER

The Government has rights in this invention pursuant to Contract No. NAS1-15440 awarded by NASA.

This invention relates to improved symmetrization optics for a junction laser and, more particularly, to the miniaturization of the symmetrization optics. Symmetrization optics are required because a junction laser inherently emits an asymmetric light beam.

The junction laser provides a small, relatively efficient light source of infra-red or visible radiation. Such a light source is useful for many applications including, inter alia, fiber-optic communication systems and optical video disc record and readout systems. In order to achieve high optical efficiency, however, it is necessary to employ appropriate optics for collecting all (or at least substantially all) of the light emitted as a diverging asymmetric beam from the junction of the junction laser, and then focusing, collimating or otherwise imaging this beam for use in the system.

More specifically, the size of both the lateral and the transverse dimensions of the junction of the junction laser are so small that a significant degree of divergence in the light beam emitted therefrom occurs in both dimensions. However, the dimensions of the junction of a junction laser are inherently asymmetric, with the size of the lateral dimension of the junction being many times larger than that of the transverse dimension thereof. Therefore, divergence in the transverse direction is significantly larger than that in the lateral direction. For instance, a junction laser having a transverse dimension of about 1 micrometer ($\mu$m) and a lateral dimension of about 10 $\mu$m emits a light beam having a divergence of about 40° in the transverse direction and about 10° in the lateral direction.

Imaging optics are normally designed to operate with a substantially symmetrical cross-section beam of light, rather than with the asymmetric cross-section beam of light emitted from a junction laser. Symmetrization optics must, therefore, be introduced between the junction laser and the imaging optics for the purpose of converting the asymmetric, highly divergent light beam emitted from the junction laser into a substantially symmetric output beam that may be applied to conventional imaging optics. Further, such symmetrization optics should be designed to gather all (or at least substantially all) of the light in the highly divergent beam emitted from the junction laser in order to avoid a significant reduction in the effective optical efficiency of the junction laser.

In the past, such symmetrization optics were bulky and relatively expensive. The miniaturized symmetrization optics of the present invention overcomes both of these disadvantages of prior art symmetrization optics.

In accordance with the principles of the present invention, miniaturized symmetrization optics for a junction laser are provided. Such miniaturized symmetrization optics comprise first and second cylindrical rods of respective selected given diameters and axial lengths, the diameters being of the order of millimeters or less. The first rod is situated at a first selected distance from the emitting junction of the laser in the path of the divergent beam therefrom, with the axial length of the first rod being oriented substantially parallel to the lateral dimension of the junction. The selected given diameter and axial length of the first rod, as related to the first selected distance, is sufficient for the first rod to collect at least substantially all the emitted light in the divergent beam emitted from the junction of the laser. The selected given diameter and axial length of the first rod results in the first rod occupying a first volume of space with respect to the junction laser. The first rod is composed of a material exhibiting a first selected index-of-refraction. The second rod is situated at a second selected distance, greater than the first selected distance, from the emitting junction of the laser in the path of the divergent output beam from the first rod, with the axial length of the second rod being oriented substantially parallel to the transverse dimension of the junction. The selected given diameter and axial length of the second rod, as related to the second selected distance, is sufficient for the second rod to collect at least substantially all the light of the beam emerging from the first rod. The selected given diameter and axial length of the second rod results in the second rod occupying a second volume of space with respect to the junction laser. The second rod is composed of a material exhibiting a second selected index-of-refraction. By properly selecting the respective values of the first and second distances, the first and second indices-of-fraction, and the respective diameters and axial lengths of the first and second rods, the first and second volumes of space occupied respectively by the first and second rods may be made mutually exclusive, while causing the first and second rods to cooperate as a lens system to derive a symmetrical output cross-section beam of light from this lens system.

In the drawings:

FIGS. 1a, 1b, and 1c diagrammatically illustrate a junction laser and the divergent light beam emitted from the junction thereof;

FIG. 2 is a block diagram of a junction laser and the optics associated with the light beam emitted therefrom;

FIG. 3 illustrates a prior art embodiment of the symmetrization optics of FIG. 2;

FIG. 5 is an example of a practical embodiment of an assembly incorporating both a junction laser and the miniaturized symmetrization optics of the present invention.

Figure 4:
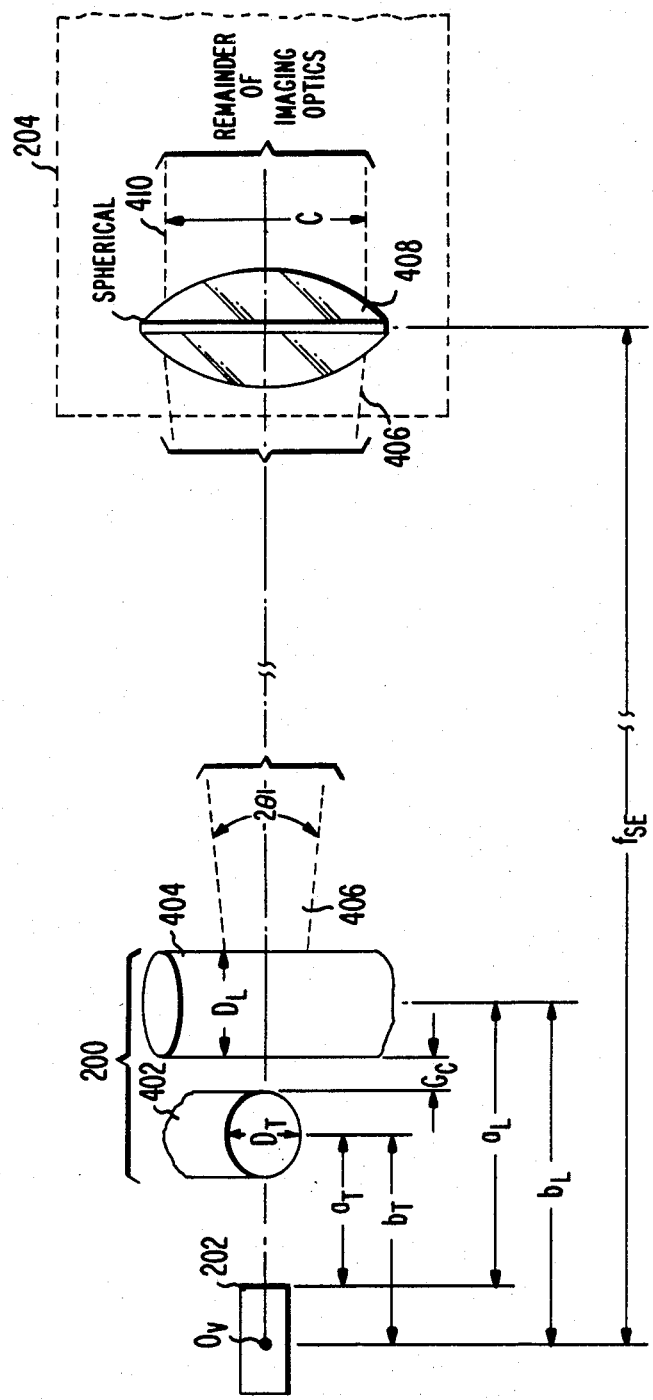
FIG. 4 shows an illustrative embodiment of the symmetrization optics of FIG. 2 which incorporates the present invention.

As is known in the art, typical junction lasers are small semiconductor diodes composed of suitably doped III-V materials. More specifically, as shown in FIGS. 1a, 1b and 1c, a junction laser 100 comprises a P-type region 102 and an N-type region 104, which contact each other in a layer forming the junction 106 of laser 100. The cleaved front and rear surfaces of junction laser 100 cooperate to form a laser cavity. In response to the injection of a current of sufficient intensity between the P and N regions 102 and 104 through junction 106 of junction laser 100, stimulated emission of photons takes place within junction 106, resulting in a laser beam 108 being emitted from the front surface of junction 106, as shown in FIGS. 1b and 1c. As shown in FIG. 1a, the lateral dimension L of junction 106 is many times that of the transverse dimension T of junction 106. However, in absolute terms, the respective values of L and T are very small. Typically, the respective sizes of the lateral dimensions L and the transverse dimension T of junction 106 are such as to produce a near-field pattern of emitted light having a lateral dimension of about 10 $\mu$m and a transverse dimension of only about 1 $\mu$m.

Due to diffraction, the small size of these dimensions results in light beam 108 being significantly divergent both laterally and transversely. However, because the size of the transverse dimension is so much smaller than that of the lateral dimension, light beam 108 is substantially asymmetrical, with the transverse divergence angle $2\theta$ ($\theta$ being measured with respect to the optical axis) being much larger than the lateral divergence angle $2\phi$. For a near-field transverse size of 1 $\mu$m, transverse divergent angle $2\theta$ is about 40°. For a near-field lateral size of 10 $\mu$m, lateral divergence angle $2\phi$ is about 10°.

Referring to FIG. 2, there is shown symmetrization optics 200 inserted between junction laser 202 (which in all material respects is similar to junction laser 100) and conventional imaging optics 204. Depending upon the ultimate use of a light beam, imaging optics 204 includes such elements as one or more lenses, mirrors and/or prisms for either collimating, focusing or otherwise imaging a substantially symmetrical cross-section input beam of light applied thereto. Since junction laser 202 inherently generates a highly divergent asymmetric beam of light, it is necessary to employ symmetrization optics 200 for converting this divergent, asymmetric beam of light into the substantially symmetrical cross-section beam of light required by conventional imaging optics 204.

Referring to FIG. 3, there is shown a prior art embodiment of symmetrization optics 200. It is comprised of microscope objective 300, relatively large diameter cylindrical lens 302 and relatively large diameter cylindrical lens 304. Microscope objective 300, which has a high-numerical aperture and is situated in close proximity to the emitting junction of junction laser 202, is effective in collecting all or substantially all of the light emitted by junction laser 202 and then either collimating the light or, as shown in FIG. 3, focusing this light within a crossover region in the vicinity of point 306. The diverging beam of light emerging from the crossover region in the vicinity of point 306 is still asymmetrical, but its respective transverse and lateral divergence angles are substantially smaller than the corresponding transverse and lateral divergence angles of the light directly emitted from the junction of laser 202. Cylindrical lens 302, which has a diameter of at least 1 cm (and may be substantially larger) and is situated at a distance A from point 306, is effective in the transverse direction of intercepting substantially all of the divergent beam emerging from point 306 and transforming it into a beam in the transverse direction that may be either substantially parallel, slightly convergent or slightly divergent, as desired. Cylindrical lens 304, which is located at a distance A+B from point 306 and also has a diameter of at least 1 cm, operates in the lateral direction in a similar manner to lens 302, to provide corresponding curvature beam in the lateral direction. More specifically, the respective distances A and B and the respective refractive properties of cylindrical lenses 302 and 304 are selected so that the beam emerging from lens 304 has a substantially square symmetry, with the cross-section size in both the transverse and lateral direction being equal to C as the beam just emerges from lens 304. When the symmetrical beam emerging from lens 304 is either slightly convergent or slightly divergent, it has substantially the same slight positive or negative curvature (as the case may be) in both the transverse and lateral directions as it emerges from lens 304. This resuts in a cross-section size decreasing at a slight rate or increasing at a slight rate as the beam propagates toward the right beyond lens 304. However, in the case of a parallel output beam from lens 304, the cross-section size remains substantially constant and the beam remains substantially collimated, as the beam propagates toward the right.

The prior art symmetrization optics 200 shown in FIG. 3 has several disadvantages. First, it requires microscope objective 300, which is a relatively expensive device. Second, optics are bulky; the cylindrical lenses 302 and 304 are relatively large in size and the respective distances A and B are also relatively large. Typically, the distance between the emitting junction of laser 202 and the output beam from lens 304 is in the range of 15-30 cm. Conventionally, imaging optics 204 comprises one or more spherical lenses that cooperate with the symmetrization optics 200 to provide a useful output beam of light having desired characteristics. Imaging optics 204 of a type that are often required for use with the prior art symmetrization optics 200 of FIG. 3 contains several spherical lenses that are spaced from one another and from the symmetrization optics 200 along the optical axis. Such imaging optics 204 may, on occasion, add 50 cm or more to the length along the optical axis of the total optical system. For instance, in cases where it is desired to focus a beam to a minimum spot size for such purposes as (1) fiber-optic commuunication or (2) readout or write interrogation of an optical video disk, the overall length of the optical path between the emitting junction of laser 202 and the position of the focused minimum spot size of the beam may approach one meter in length. The miniaturized symmetrization optics 200 of the present invention, shown in FIG. 4, overcome the disadvantages of the prior art symmetrization optics, shown in FIG. 3.

The symmetrization optics 200 of the present invention, shown in FIG. 4, which requires only two cylindrical lenses comprised of millimeter-sized rods of optical material, does away completely with the need for any microscope objective. More specifically, cylindrical lens 402, having a diameter of $D_T$ and oriented substantially parallel to the lateral axis of the beam emitted from junction laser 202, is situated at a distance $a_T$ from the emitting junction of laser 202. Similarly, cylindrical lens 404, having a diameter $D_L$ and oriented substantially parallel to the transverse axis of the beam emitted from laser 202, is situated at a distance $a_L$ from the emitting junction of laser 202. As shown in FIG. 4, lens 404 is separated from lens 402 by a distance $G_C$. The respective sizes of the dimension $a_T$, $a_L$, $D_T$, $D_L$ and $G_C$ are all quite small. By way of example, for one case, in which the transverse and lateral divergence angles $2\theta$ and $2\phi$ from the emitted laser beam were 28.5° and 7.5°, respectively, lens 402 was comprised of a 1-millimeter rod of Schott LASF-6 glass having a refractive index of 1.965 at nominal wavelength of 0.82 $\mu$m. Lens 404 was comprised of a rod having a diameter of 2.944 millimeters of fused quartz having a refractive index of 1.4526 at a wavelength of 0.82 $\mu$m. While not critical, in one particular design the lengths of the rods forming lenses 402 and 404 was less than one quarter inch, as will become clear from FIG. 5. The distance $a_T$ was 0.525 mm; the distance of $a_L$ was 4.398 mm and the distance $G_C$ was 1.035 mm. Because lens 402 is situated so close to the emitting junction of laser 202, it can collect all or substantially all of the highly divergent light emitted from the laser junction without the need for any microscope objective, despite the fact that the diameter of lens 402 is only about 1 mm.

If the symmetrization optics 200 of FIG. 4 is to perform its intended purpose of providing a symmetrical cross-section beam of light at the output of lens 404 having a convergence angle of $2\theta_1$ (i.e., $\theta_1$ is positive for convergent output beams, zero for parallel output beams and negative for divergent output beams), it is necessary that both lenses 402 and 404 have the proper refractive characteristics with respect to the respective transverse and lateral divergences of the light beam emitted from the junction laser 202. As is known in optics, the refractive characteristics of a lens are functions of both the radius of curvature of the lens and the index of refraction of the material of which the lens is composed. Specifically, the refracting power of each of lenses 402 and 404 is indirectly proportional to the diameter thereof and directly proportional to the index of refraction of the material of which that lens is composed. At the same time, the respective diameters of lenses 402 and 404 must be sufficiently large so that substantially all the light emitted from junction laser 202 is intercepted by both lens 402 and 404. These requirements place constraints in the design of symmetrization optics 200 of the type shown in FIG. 4.

The minimum diameter $D_T$ of lens 402 depends both on the size of the divergence angle in the transverse direction of the light emitted from the junction of laser 202 and the distance $a_T$ between laser 202 and lens 402. Similarly, the minimum diameter $D_L$ of lens 404 depends both on the size of the divergence angle in the lateral direction of the light emitted from the junction of laser 202 and the distance $a_L$ between laser 202 and lens 404. It is desirable to make the distances $a_T$ and $a_L$ as small as practicable in order to reduce the minimum required size of diameters $D_T$ and $D_L$. Smaller values of these lens diameters permits the desired refraction by each of lenses 402 and 404 to be achieved without requiring an excessively high index of refraction for each of the respective materials of which they are composed. However, it is essential that the space occupied by lens 404 not overlap the space occupied by lens 402, that is the respective spaces occupied by lenses 402 and 404 must be mutually exclusive. Thus, the minimum size of the length $a_L$ must be greater than the sum of the length $a_T$ plus one-half the sum of the diameters $D_T$ and $D_L$. Otherwise, $G_C$ will not be a positive number, as it must be in order for the spaces occupied by lenses 402 and 404 to not overlap. To meet all these conditions and still provide a symmetrical cross-section output beam 406, it is usually required that lens 402 and lens 404 be composed of materials having different indices of refraction.

In the example shown in FIG. 4, symmetrical output beam 406 is a slightly divergent beam having a negative convergence angle $-2\theta_1$ and having a virtual origin $O_V$ at a point on the object side of the optical axis situated slightly behind the emitting junction of laser 202. The distance between this virtual origin $O_V$ and lens 402 is $b_T$ and the distance the virtual origin $O_V$ and lens 404 is $b_L$. Imaging optics 204 includes an input spherical lens 408 having a focal length $f_{SE}$ substantially equal to the distance between virtual origin $O_V$ and lens 408. Spherical lens 408 occupies an aperture at least sufficient to intercept all of slightly divergent beam 406, as shown in FIG. 4. Beam 406 is collimated into parallel output beam 410 by spherical lens 408. Output beam 410, as well as input beam 406, exhibits square symmetry, with the cross-section size of output beam 410 being C. In the specific example case, discussed above, the focal distance $f_{SE}$ is about 10 cm, the value of C is about 8 mm and the convergence angle $-2\theta_1$ of the divergent output beam is 2.29°. For illustrative purposes, it has been assumed in FIG. 4 that symmetrical cross-section beam 406 is slightly divergent. However, it should be understood that the refractive powers of lens 402 and lens 404 of symmetrization optics 200 may be designed to provide a symmetrical output beam from lens 404 that is either substantially collimated (i.e., has a zero convergence angle) or, alternatively, is convergent (i.e., has a positive convegence angle).

Up to this point, the invention has been described in qualitative terms. The following formulas, based on incoherent optics, are applicable to relatively high-mode junction laser light sources. Corresponding, but more complex, formulas, known in the art of coherent optics, may be used with lasers exhibiting a single or only a few modes. Further, whether the desired symmetrical output beam is to be divergent (as shown by way of example in FIG. 4), parallel or convergent, to meet the requirements of symmetrization, the output beam convergence angle $\theta_1$ must be the same in both the transverse and lateral planes. The following analysis considers the conditions under which this symmetrization requirement is met.

It is assumed that in the transverse direction the beam originates from a point source located at the laser emitting junction. The point is actually the intersection of a line parallel to the X axis (in the junction plane) and the X-Y plane. The length of this line is the width of the lateral laser mode ($l_L$) at the laser emitting junction. The width of the transverse mode ($\sim 1.0\ \mu m$) can be ignored with negligible error in this lens calculation. In the lateral plane it is assumed that the beam originates at a point source a distance $a_{L1} \leq l_L/2\ \mathrm{Tan}\ \phi$ behind the laser emitting junction. $a_{L1}$ depends, in fact, on the character of the beam waist at the laser emitting junction. For some lasers $a_{L1} \sim 0$. For a complete circular cylinder, the principal plane generates to a single plane through the cylindrical axis. $a_T$, $(a_L - a_{L1})$ are the physical distances of the transverse and lateral lens axes from the light sources. $b_T$, $b_L$ are the respective distances to the beam waist W. W is required to be equal in both the transverse and lateral directions. Because of the presence of the transverse lens in the object space of the lateral lens, $a_L$ is less than the optical length of the lateral object distance. Similarly, the presence of the lateral lens in the image space of the transverse lens makes $b_T$ less than the optical length of the transverse image distance.

This is compensated for in the subsequent calculation by increasing the lateral object distance by the first order correction $(n_T - 1)D_L$. Here, and in the remaining calculation, $n_T$ is the refractive index of the transverse lens and $n_L$ that of the lateral lens.

The focal length of a circular cylinder of refractive index n and diameter D is $$f = (4(n-1)^2/n)D \tag{1}$$

Thus, $$f_T = [4(n_T-1)^2/n_T]D_T \tag{2}$$

$$f_L = [4(n_L-1)^2/n_L]D_L \tag{3}$$

Let, $$a = \frac{4(n_T - 1)^3}{n_T} \qquad (4)$$

and Let, $$b = \frac{4(n_L - 1)^3}{n_L} \qquad (5)$$

Then lens formulas can be written as follows:

$$\frac{1}{a_L + a f_T} + \frac{1}{b_L} = \frac{1}{f_L} \qquad (6)$$

$$\frac{1}{a_T} + \frac{1}{b_t + b f_L} = \frac{1}{f_T} \qquad (7)$$

To ensure that $\theta_1$ and W are equal for both planes requires that $$\frac{(a_L + a f_T) \mathrm{TAN}\, \phi}{b_L} = \frac{a_T \mathrm{TAN}\, \theta}{b_T + b f_L} \qquad (8)$$

The value of $\theta_1$ is given by $$\mathrm{Tan}\, \theta_1 = \frac{a_T}{b_T + b f_L} \tan \theta \qquad (9)$$

These are the first order corrections mentioned earlier. Finally, to ensure that the beam waist lies at a common point along the Z axis for both the lateral and transverse plane, it is necessary that the physical distance of the beam waist from the laser emitting junction be the same in both planes. Thus, $$a_T + b_T = a_L - a_{L1} + b_L \qquad (10)$$

$\theta$, $\phi$, and $a_{L1}$ are known and $\theta_1$ or W, which are not independent, are chosen. Also chosen are $n_T$, $n_L$ and $D_T$ or f, which leaves the five unknowns; $D_L$ (related to $f_L$ through eqs. (2) and (3)), $a_T$, $b_T$, $a_L$ and $b_L$. Relating these quantities are the five eqs. (6), (7), (8), (9) and (10). In addition, $$\mathrm{TAN}\, \theta_1 = \frac{\lambda_o}{W} \qquad (11)$$

which relates the beam waist size W to $\theta_1$ in accordance with the nominal light wavelength $\lambda_o$. If a transverse lens "convergence" ratio is defined as $$B = \frac{\mathrm{Tan}\, \theta_1}{\mathrm{Tan}\, \theta} = \frac{\lambda_o}{W_T \mathrm{Tan}\, \theta} \qquad (12)$$

and the laser transverse to lateral divergence ratio is defined as $$\Delta = \frac{\mathrm{Tan}\, \theta}{\mathrm{Tan}\, \phi} \qquad (13)$$

the following solution results:

$$f_L = \frac{1}{\left[\frac{(B\Delta + 1)^2}{B\Delta} + b\right]} \left\{ f_T \left[\frac{(B+1)^2}{B} + a\right] + a_{L1} \right\} \qquad (14)$$

-continued $$a_T = f_T (B + 1) \qquad (15)$$

$$b_T = f_T \left(\frac{1}{B} + 1\right) - b f_L \qquad (16)$$

$$a_L = f_L (B\Delta + 1) - a f_T \qquad (17)$$

$$b_L = f_L \left(\frac{1}{B\Delta} + 1\right) \qquad (18)$$

However, as set forth above $$f_T = [4(n_T - 1)^2 / n_T] D_T \qquad (2)$$

$$f_L = [4(n_L - 1)^2 / n_L] D_L \qquad (3)$$

For the solutions of Eqs. (14) through (18) to be physically realizable, the distance $G_C$ between the lens surfaces must be greater than or equal to zero. $G_C$ is given by $$G_C = (a_L - a_{L1} - D_L/2) - (a_T + D_T/2) \qquad (19)$$

In addition it is desirable to have both $D_T$ and $D_L$ large enough to accept all of the beam. The maximum angles accepted are given by $$\theta_M = \sin^{-1} D_T / 2 a_T \text{ and } \phi_M = \sin^{-1} D_L / 2 a_L \qquad (20)$$

in the transverse and lateral directions, respectively. The rejection ratios $\theta/\theta_M$ and $\phi/\phi_M$ should be as small as possible to ensure maximum beam acceptance, minimum cylindrical distortion and make as close an approximation as possible to the first-order length corrections. When $\theta/\theta_M > 1$ or $\phi/\phi_M > 1$, all the light is not collected.

In the design of a system employing the present invention, equations (11) through (20) and (2) and (3) are used as follows: $n_L$, $n_T$, and $D_T$ are chosen. Then for a desired beam waist W or convergence angle $\theta$ (note from Eq. (11) that these are not independent), the required lateral lens diameter $D_L$ and the spacings are calculated. All of the spacings and the lateral lens diameter can be determined as a fraction or multiple of the chosen transverse lens diameter.

What happens for a very small beam waist of positive convergence angle (convergent symmetrical beam) is that if the refractive index is increased in an attempt to collect all the light, the lenses overlap. If the refractive index is decreased to avoid the overlap, the lens optical aperture is reduced below that required for full collection.

At larger beam waists and smaller or negative (divergent beam having virtual origin on object side) convergence angles this problem is avoided.

Referring to FIG. 5, there is shown an integral assembly for rigidly supporting junction laser 202 and the transverse lateral lenses 402 and 404 of symmetrization optics 200 in substantially operative spatial relationship with one another. The assembly comprises a miniature metallic block 500 forming a laser (L) mount, an insulator 502, metal foil 504, conductor 506 and metal lens holder 508. As shown in FIG. 5, junction laser 202 is mounted with its bottom resting on the front of the upper surface of block 500. Metal foil 504 is supported by insulator 502, which, in turn, is mounted on the rear of the upper surface of block 500. Conductor 506 connects metal foil 504 to the top of junction laser 202. As indicated in FIG. 5, block 500 serves as the positive grounded electrode and metal foil 504 and conductor 506 serve as the negative electrode for injecting laser pumping current through junction laser 202. Further, block 500 operates as a heat sink for junction laser 202. Lens holder 508 is cemented to a front side surface of block 500 by a layer of cement 510. Lens holder 508 may be made of brass having dimensions one quarter inch high and one quarter inch in a direction perpendicular to that of the plane of the paper. Lens holder 508 includes a central hole 512 of about one-eighth inch in diameter, which is much larger than the aperture of the beam of light emitted from junction laser 202, permitting all of the laser light to pass therethrough. Transverse lens 402 is situated within a V-notch that extends across a diameter in a direction perpendicular to the plane of the paper, of the rear surface of lens holder 508. Lateral lens 404 is situated within a V-notch that extends across a diameter, in the vertical direction, of the front surface of lens holder 508. Junction laser 202, transverse lens 402 and lateral lens 404 are properly aligned with respect to one another to produce a symmetrical cross-section output beam from lateral lens 404 of the miniaturized symmetrization optics assembly shown in FIG. 5, in accordance with the principles of the present invention, discussed above.

What is claimed is:

1. Improved symmetrization optics for a junction laser that emits from a surface of its junction layer an asymmetrical light beam that diverges in both the lateral and transverse directions with respect to the junction layer plane of said laser; said symmetrization optics comprising:

first and second cylindrical rods of respective selected given diameters and axial lengths, said diameters being of the order of millimeters or less;

said first rod being situated at a first selected distance from the emitting junction of said laser in the path of the divergent beam therefrom, with the axial length of said first rod being oriented substantially parallel to the lateral dimension of said junction; said selected given diameter and axial length of said first rod, as related to said first selected distance, being sufficient for said first rod to collect at least substantially all the emitted light in said divergent beam, whereby said first rod occupies a first volume of space with respect to said junction laser; said first rod being composed of a material exhibiting a first selected index-of-refraction;

said second rod being situated at a second selected distance, greater than said first selected distance, from the emitting junction of said laser in the path of the divergent output beam from said first rod, with the axial length of said second rod being oriented substantially parallel to the transverse dimention of said junction; said selected given diameter and axial length of said second rod, as related to said second selected distance, being sufficient for said second rod to collect at least substantially all of the light of the beam emerging from said first rod, whereby said second rod occupies a second volume of space with respect to said junction laser; said second rod being composed of a material exhibiting a second selected index-of-refraction; and wherein the respective selected values of said first and second distances, said first and second indices-of-refraction, and the respective diameters and axial lengths of said first and second rods are such that (1) said first and second volumes of space are mutually exclusive, and (2) said first and second rods cooperate as a lens system to derive a symmetrical cross-section output beam of light from said lens system.

2. The symmetrization optics defined in claim 1, wherein said respective selected values are such that said symmetrical output beam is a divergent output beam having a virtual origin situated on the optical axis at a point in said junction layer of said laser, said divergent output beam having a square cross-section of a given size at a given distance from said virtual origin, whereby a spherical imaging lens situated at said given distance from said virtual origin and having an aperture including all of said square cross-section and a focal length no greater than said given distance is effective in collecting substantially all the light in said divergent output beam and converting it into a collimated or convergent beam, as determined by the focal length of said spherical lens.

3. The symmetrization optics defined in claim 2, wherein said respective selected values are such as to provide said square cross-section of said divergent output beam with a given size of substantially eight millimeters for the side of said square cross-section at a given distance of substantially ten centimeters from said virtual origin.

4. The symmetrization optics of claim 3, wherein said divergent beam emitted from the junction of said laser diverges by substantially 28.5° in the transverse direction and 7.5° in the lateral direction, wherein said first rod has a diameter of substantially one millimeter and an index-of-refraction of substantially 1.965 at a nominal wavelength of 0.82 micrometers and is situated at a first distance of substantially 0.525 millimeters from the emitting junction of said laser, and wherein said second rod has a diameter of substantially 2.944 millimeters and an index-of-refraction of substantially 1.4526 at a nominal wavelength of 0.82 micrometers and is situated at a second distance of substantially 4.398 millimeters from the emitting junction of said laser, whereby said divergent output beam diverges in both the transverse and lateral direction at an angle of substantially 2.29°.

5. The symmetrization optics defined in claim 1, wherein said symmetrization optics comprise an integral assembly on which said laser is mounted, said assembly holding said first and second rods in substantially fixed rigid relationship with respect to said laser and with respect to one another.

* * * * *